Figure 1:
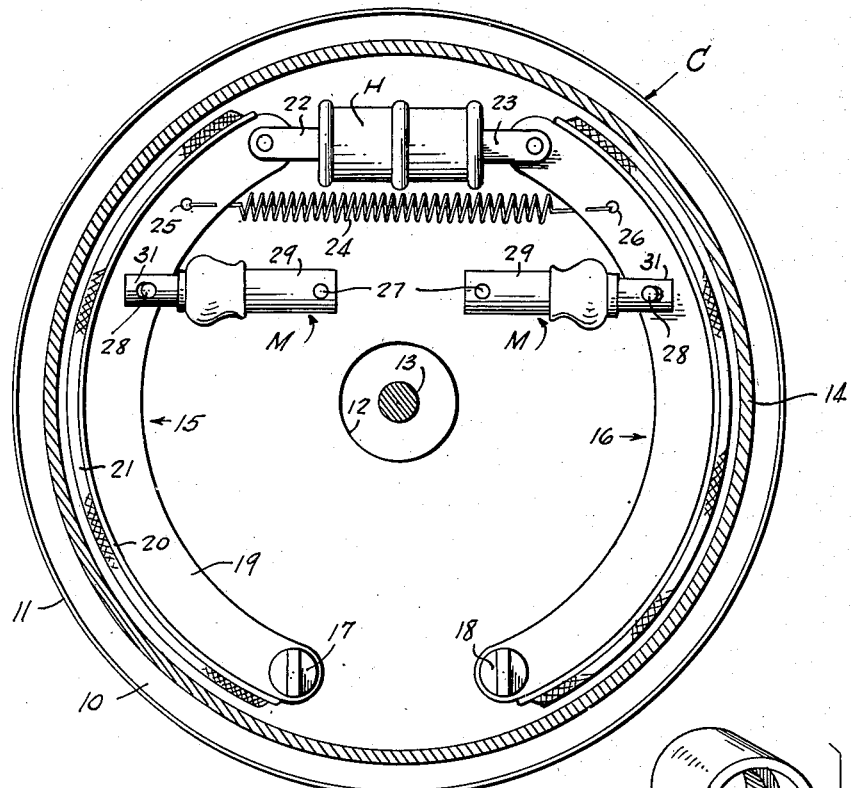

April 1, 1941.  A. E. LUDWIG  2,236,777
BRAKE
Filed May 14, 1940   2 Sheets-Sheet 1

INVENTOR.
ARNOLD E. LUDWIG.
BY Joshua R H Potts
ATTORNEY

April 1, 1941.  A. E. LUDWIG  2,236,777
BRAKE
Filed May 14, 1940  2 Sheets-Sheet 2

INVENTOR.
ARNOLD E. LUDWIG.
BY
ATTORNEY

Patented Apr. 1, 1941

2,236,777

UNITED STATES PATENT OFFICE 2,236,777

BRAKE

Arnold Edward Ludwig, Asbury Park, N. J.

Application May 14, 1940, Serial No. 335,049

9 Claims. (Cl. 188—79.5)

This invention relates to brakes and is concerned primarily with improvements in mechanism designed to control retraction of a movable braking element into brake released position.

In the co-pending application of Arnold Edward Ludwig, filed April 27, 1940, Serial No. 331,922, entitled "Brake," there is illustrated and described a mechanism for controlling retraction of a braking element into brake released position, and it is such a mechanism that is intended to be improved by this invention.

A brake such as is commonly employed in the modern motor vehicle ordinarily comprises a casing, a pair of braking elements, one of which is movable relative to the other, a brake lining on one of the elements adapted to engage a surface of the other, means for moving the movable braking element so that the lining of one element engages the other, and means for retracting the movable braking element into brake released position.

In the above-identified co-pending application of Ludwig, there is illustrated and described a mechanism for controlling retraction of said movable braking element whereby the clearance between the lining on one braking element and the surface of the other element with which it is adapted to engage is maintained substantially uniform and constant for the brake released position. This retraction controlling mechanism generally consists of a pair of relatively movable parts that are slidably interfitted. An overrunning clutch assembly is associated with these parts which permits of relative expansion, but which overrunning clutch prevents relative contraction of the parts. Provision is made for releasing the overrunning clutch so that the contraction of the parts may be effected under certain conditions such as at the time of installing new brake linings.

The present invention has in view, as its foremost objective, the provision of a retraction controlling mechanism of the character above-noted in which a novel and highly simplified overrunning clutch assembly is included.

More in detail this invention has in view, as an object, the provision of a retraction controlling mechanism of the character above-noted in which the overrunning clutch mechanism is readily and easily assembled with one of the relatively expansible parts.

Another highly important object is the provision of mechanism of the character above-noted which includes novel means for releasing the overrunning clutch.

In attaining the above-noted objectives, the invention provides outer and inner telescopic parts. One of these parts is attached to either the casing or the movable braking element by a pivoted connection while the other part is attached to the other of said casing or movable braking element by a pin and slot connection permitting a certain predetermined amount of movement between said part and the member to which it is attached. The overrunning clutch assembly is carried by the inner telescopic member.

An important object in view is the provision of such mechanism in which a frusto-conical member is carried by the inner telescopic member and associated therewith is a spring for retaining clutch ball elements in effective position.

Still another somewhat more detailed object is the provision of mechanism of the character above-noted in which a releasing ring is assembled about the inner telescopic member, and spring means are associated therewith for normally retaining the same in ineffective position. A passageway between said telescopic members is provided to permit of the insertion of a tool to engage said ring so that the same might be actuated to disengage the clutch ball elements, as occasion demands.

Important features of the invention are associated with the particular manner of assembling the clutch ball elements and the spring that is associated therewith, as well as the release ring and its retaining spring on the inner telescopic member.

Another highly important object of the invention is the provision of mechanism of the character above-noted in which the clutch ball elements are carried by a retaining device that is movable as an entirety. With this arrangement, together with the above-noted structural provision for the insertion of a tool, the entire clutch ball assembly, including the retaining device, may be moved to release the clutch.

Particular features of the invention are associated with the manner of assembling the retaining device about the inner telescopic part.

Still another object of the invention is the provision of mechanism of the character above-noted in which the inner telescopic part is rendered sectional in construction, that is, a spring backing member is provided as a separate piece and adapted to be attached to the inner telescopic part after the clutch ball assembly and the spring associated therewith have been positioned about the frusto-conical section.

Particular features and advantages of the invention are associated with the manner in which the spring backing member is attached to the inner telescopic part.

The invention, therefore, comprises mechanism for controlling retraction of the movable brake element into brake released position that consists of inner and outer telescopic parts, together with an overrunning clutch assembly for permitting relative expansion of the parts, but preventing relative contraction. The overrunning clutch assembly is carried by the inner telescopic part and suitable provision is made for affecting the overruning clutch assembly so that it may be rendered ineffective when occasion demands.

Figure 4:
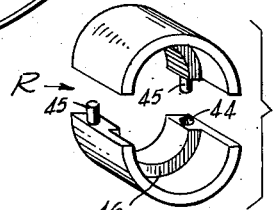
Figure 2:
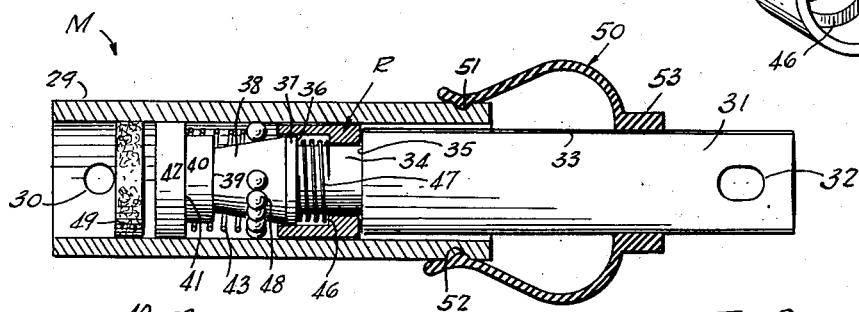
Figure 3:
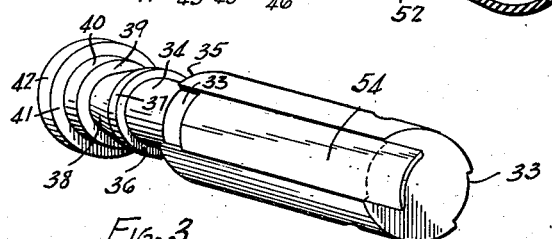
Figure 5:
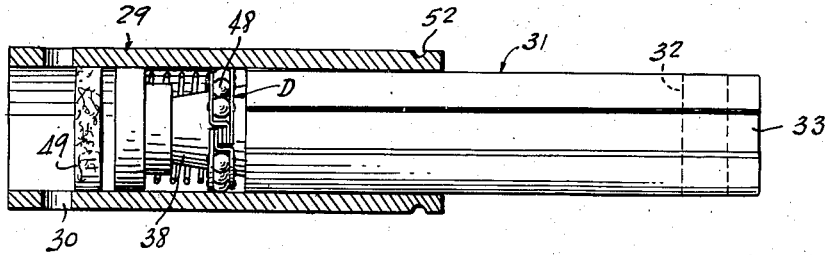
Figure 6:
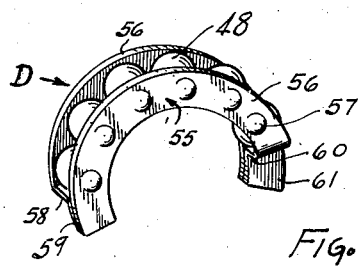
Figure 7:
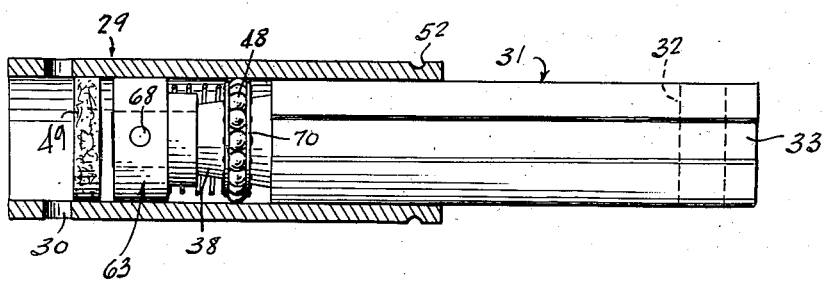
Figure 8:
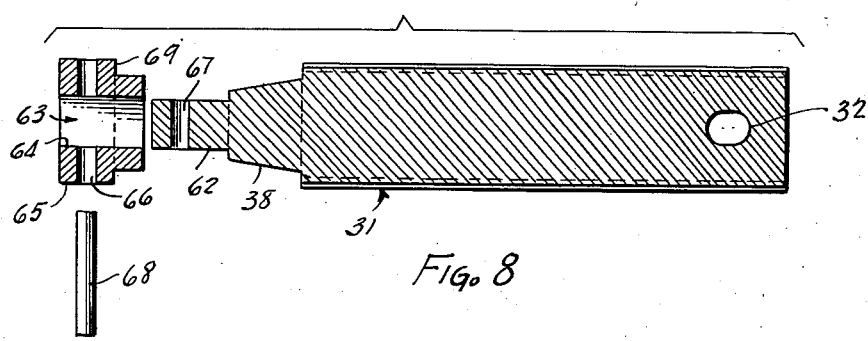

For a full and more complete understanding of the invention reference may be had to the following description and accompanying drawings wherein:

Figure 1 is a side view partly in section and partly in elevation of a brake to which retraction controlling mechanisms, such as contemplated by this invention, have been applied, Figure 2 is an enlarged detailed view in section through one of the mechanisms, Figure 3 is an enlarged detailed view in perspective of the inner telescopic part, Figure 4 is a perspective view showing the two parts of the release ring in exploded relation, Figure 5 is a section through one modification, Figure 6 is an enlarged perspective view of the ball retaining device employed in the modification of Figure 5, Figure 7 is a sectional view through another modification, and Figure 8 is a sectional view developing the several parts of the inner telescopic member of Figure 7 in exploded relation.

Referring now to the drawings, wherein like reference characters denote corresponding parts, and, first, more particularly to Figure 1, a brake which is intended to be exemplary of the modern automobile brake is shown as comprising a casing C. This casing C includes a disk-'.e plate 10 that carries at its outer periphery a housing flange 11. The plate 10 is formed with the usual central opening 12 through which passes an automobile axle 13. A brake drum is represented at 14 and it is the inner surface of this drum which is the effective braking surface. Brake shoes are referred to in their entirety by the reference numerals 15 and 16. The shoe 15 is pivotally mounted on the casing plate 10, as shown at 17, while the shoe 16 is similarly mounted, as indicated at 18.

Each of the shoes 15 and 16 comprises a main rib or web 19 that carries an arcuate flange 20 and the flange 20 in turn carries a brake lining as shown at 21. A hydraulic cylinder unit is represented at H and may be of any type now well-known in the braking art. The unit H includes a piston (not illustrated) which is connected as by a link 22 with the shoe 15.

Unit H also includes another piston (also not illustrated) which is connected to the shoe 16 as by a link 23. It is evident that the hydraulic unit H may be operated to expand the shoes 15 and 16 and cause the linings 21 thereon to engage the inner surface of the drum 14. When the unit H is released a tension spring 24 retracts the shoes 15 and 16 into brake released position. It is notable that the spring 24 it anchored at one end to the shoe 15, as shown at 25, and its other end to the shoe 16, as shown at 26.

In accordance with this invention a mechanism for controlling retraction of the shoes 15 and 16 into brake released position is associated with each of the shoes 15 and 16. Each of these mechanisms is shown in Figure 1 and referred to generally by the reference character M. Inasmuch as the mechanisms M are substantially alike, the detailed construction of only one such mechanism is here described.

Before referring to Figures 2, 3 and 4, it is notable that a pair of pins 27 are carried by the plate 10 and extend inwardly to the brake casing. Also, a pin 28 is carried by the web 19 of each of the shoes 15 and 16. It is to the pins 27 and 28 that the mechanisms M are attached. As shown in Figure 2 the mechanism M comprises an outer telescopic part which is of tubular formation and which is designated 29. At one end the member 29 is formed with aligned openings 30 that are diametrically opposite each other and which receive one of the pins 27, thus effecting a connection with the casing plate 10. An inner telescopic part is designated 31 and is shown as formed with a slot 32. This slot 32 receives the pin 28 and it is the amount of movement of the pin 28 in the slot 32 that determines the amount of movement of a shoe into brake released position.

The main body part of the inner telescopic member 31 is of cylindrical formation and complemental to the outer telescopic part 29 into which it interfits. This cylindrical portion is formed with a pair of arcuate grooves 33 for tool insertion purposes, as will be later described.

Adjacent the main body portion of the inner telescopic member 31 the latter is formed with a cylindrical section 34 of a reduced diameter and which terminates at its ends in shoulders 35 and 36. Immediately adjacent the shoulder 36 there is a ring-like portion of cylindrical formation of increased diameter which is designated 37. Adjacent to this ring-like part 37 there is a frusto-conical section 38. The latter terminates at its small end at a shoulder 39 formed as a part of a cylindrical section 40. The latter terminates at another shoulder 41 which is formed on a cylindrical head 42 that snugly interfits in the bore of the outer telescopic part 29.

Prior to insertion of the inner member 31 with the outer member 29 a coil expansion spring 43 is assembled so that one end of the spring abuts the shoulder 41 and partially inserted thereinto is the cylindrical section 40. Also, a two-part release ring, such as depicted in Figure 4, is assembled about the cylindrical section 34. This release ring which is referred to in its entirety by the reference character R is of a two-part construction to permit of its assembly. Each of the parts is formed at one side with a recess 44 and at its other side with a pin 45, the pin 45 on one part being adapted to be fitted in the recess 44 of the other. The release ring R presents a shoulder at 46 against which abuts an expansion coil spring 47. The latter bears at its other end against the shoulder 36. It is evident that the spring 47 normally maintains the release ring R in an ineffective position.

As the inner telescopic member 31 is inserted into the outer member 29 a plurality of clutch ball members 48 are assembled about the frusto-conical section 38. It is also noted that a felt sealing ring 49 is positioned within the member 29.

To guard against dust or foreign matter entering between the parts 29 and 31 at the other end, a rubber boot, such as shown at 50, may be employed. This boot 50 includes an inner bead 51 that is received in the groove 52 formed on the exterior of the outer member 29. The boot 50 also is formed with a ring-like collar 53 through which the inner part 31 slides.

With the parts assembled as shown in Figure 2, and with the pin 27 received in the opening 30, while the pin 28 is received in the slot 32, it is obvious that when the hydraulic unit H is operated to apply the brake, the shoe which carries the pin 28 is moved outwardly. The initial part of such movement merely causes the pin 28 to move in the slot 32 until it engages the outer end thereof. Any further outward movement of the shoe causes a relative expansion of the parts 29 and 31, this being permitted by the design and arrangement of the overrunning clutch mechanism. When the hydraulic unit H is released, the retraction spring 24 is rendered effective to move the shoe inwardly. However, such inward movement is limited to the amount of movement which may occur on the part of the pin 28 in the slot 32 as any relative contraction of the parts 29 and 31 is precluded by the overrunning clutch assembly.

When occasion arises that it becomes necessary to release the overrunning clutch mechanism, such as at the time of relining the shoes, the boot 50 is removed after which a tool, such as that shown at 54, in Figure 3, is inserted in one of the arcuate grooves 33. As the insertion is continued, tool 54 engages the release ring R to move the latter into engagement with the clutch ball elements 48. Thus the latter are moved against the influence of the spring 43 towards the smaller end of the frusto-conical section 38, thereby permitting of relative contraction of the parts 31 and 29.

It is important to note that with the release ring R normally held in an ineffective position by the spring 47, there is no danger of the clutch ball element being accidentally released.

A modified and somewhat simpler form of the invention is shown in Figures 5 and 6. In this form the frusto-conical section 38 is formed immediately adjacent to the main body portion of the inner telescopic part 31. It is notable that the various structure provided for the assembly of the spring 43 is maintained substantially the same as that above-described in connection with the form of Figures 2, 3 and 4. However, the clutch ball elements 48 are assembled in a retaining device referred to in its entirety by the reference character D. This retaining device D is of a two-part construction to permit of its assembly about the frusto-conical section 38 and the spring 43 bears against this retaining device D at one end.

The retaining device D comprises two parts 55 which are substantially of duplicate construction. Each of the parts 55 comprises spaced flanges 56 between which are received the clutch ball elements 48. The flanges 56 may be deformed, as shown at 57, to accommodate the balls 48. At one end the flange 56 is bent inwardly to provide an end wall 58 and an end tab 59 that bears against and is joined to the flange 57. Similarly, the flange 57 at the other end is bent over to provide an end wall 60 and an end tab 61 that bears against and is joined to the flange 56.

The modification shown in Figures 5 and 6 functions in exactly the same manner as does the clutch ball assembly as shown in Figures 2, 3 and 4. When occasion arises that it becomes necessary to release the ball elements 48 so as to permit of contraction of the parts 29 and 31, a tool 54 is inserted in one of the arcuate grooves 33 and the insertion is continued until it engages the retaining device D. The latter is then moved as an entirety towards the smaller end of the frusto-conical section 38.

In the form of the invention shown in Figures 7 and 8, the frusto-conical section 38 is formed immediately adjacent to the main body portion of the inner section 31. Immediately adjacent to the frusto-conical section 38 there is formed a tongue 62 of reduced diametrical dimension. A spring bearing member is shown at 63 and is formed with a bore 64 which receives the tongue 62. This member 63 is formed with a cylindrical portion 65 that is snugly fitted in the bore of the outer part 29 and in which are formed aligned openings 66. When the member 63 is assembled on the tongue 62 the openings 66 align with a passageway 67 formed in the tongue 62 so that a pin 68 may pass through the aligned openings. Thus, the member 63 is held in position on the tongue 62.

It is notable that this pin 68 will be maintained in effective position due to the fact that the member 63 is normally positioned in the bore of the member 29.

The enlarged portion 65 provides a shoulder 69 against which one end of the spring 43 bears. It is important to note that with the member 63 detachable from the main body portion of the inner telescopic member 31, as above-described, the two-part construction of the ball retaining device may be dispensed with. This ball retaining device may be of the ring-like construction shown at 70 in Figure 7, and it is noted that this member, together with the clutch ball members 48, is assembled about the frusto-conical section 38 and the spring 43 is positioned prior to attaching the member 63 to the tongue 62.

The overrunning clutch mechanism of Figures 7 and 8 functions in exactly the same manner as above-described, and the release of the clutch ball elements 48 is effected in the same manner as above-described in connection with Figures 5 and 6.

While preferred specific embodiments of the invention are hereinbefore set forth, it is to be clearly understood that the invention is not to be limited to the exact constructions illustrated and described, because various modifications of these details may be provided in putting the invention into practice, within the purview of the appended claims.

I claim:

1. Retraction controlling mechanism of the character described comprising an outer telescopic part, an inner telescopic part, overrunning clutch mechanism assembled on said inner telescopic part, and means for releasing said overrunning clutch mechanism also carried on said inner telescopic part, said inner telescopic part being formed with a groove into which a tool is adapted to be inserted to engage said release means.

2. Retraction controlling mechanism of the character described comprising inner and outer telescopic parts, said inner telescopic part being formed on its exterior with a groove into which a tool is adapted to be inserted, overrunning clutch mechanism assembled on said inner telescopic part including a plurality of clutch ball elements, and release means adapted to engage all said elements whereby movement of said release means under the influence of a tool inserted into said groove releases all said clutch elements.

3. Retraction controlling mechanism of the character described comprising an outer telescopic part, an inner telescopic part, said inner part being formed with a frusto-conical section, a reduced portion between the larger end of said frusto-conical section and the main body portion of said inner part, clutch ball elements between said frusto-conical section and said outer part, spring means normally maintaining said clutch ball elements in effective position, a release ring assembled about said reduced part of said inner section, and spring means normally maintaining said release ring in ineffective position.

4. Retraction controlling mechanism of the character described comprising inner and outer telescopic parts, said inner telescopic part being formed with a frusto-conical section, a ball retaining device disposed about said frusto-conical section, a plurality of clutch ball elements retained in said device and interposed between said frusto-conical section and said outer part, and spring means normally maintaining said clutch ball elements in effective clutching position, said inner telescopic part being formed with a passageway into which a tool is adapted to be inserted to engage said ball retaining device.

5. Retraction controlling mechanism of the character described comprising inner and outer telescopic parts, said inner telescopic part being formed with a frusto-conical section, a tongue integrally connected to said inner part at the smaller end of said frusto-conical section, said tongue being formed with a transverse passageway, a spring retaining head having a bore receiving said tongue, said head being formed with openings in alignment with said passageway, a connecting pin in said aligned openings and passageway, a ball retaining device disposed about said frusto-conical section, a plurality of clutch ball elements in said device, and an expansion spring engaging said head at one end and said device at the other end.

6. Retraction controlling mechanism of the character described comprising a tubular outer telescopic part having a bore of uniform cross-section through at least part of its length, an inner telescopic part received in said bore and having a frusto-conical section between two spaced portions which slidably and snugly engage the wall of said bore at the portion of uniform cross-section, and a clutch ball assembly between said spaced portions and cooperating with said frusto-conical section.

7. Retraction controlling mechanism of the character described comprising a tubular outer telescopic part having a bore of uniform cross-section through at least part of its length, an inner telescopic part received in said bore and having a frusto-conical section between two spaced portions which slidably and snugly engage the wall of said bore at the portion of uniform cross-section, a clutch ball assembly between said spaced portions and cooperating with said frusto-conical section, and release means for releasing said clutch assembly while said spaced portions are in locked relation to the wall of said bore.

8. Retraction controlling mechanism of the character described comprising a casing having an imperforate portion with a bore therein, an inner telescopic part arranged at least partially within said bore and carrying spaced portions which snugly and slidably engage the wall of said bore, a frusto-conical portion carried by said inner part intermediate said spaced portions, and a clutch assembly interposed between said spaced portions and the wall of said bore and cooperating with said frusto-conical portion.

9. Retraction controlling mechanism of the character described comprising an outer unitary telescopic casing having a bore therein, an inner telescopic part being received within said bore and carrying spaced portions which snugly and slidably engage the wall of said bore, a frusto-conical portion carried by said inner part intermediate said spaced portions, a clutch assembly interposed between said spaced portions and the wall of said bore and cooperating with said frusto-conical portion, and means for releasing said clutch assembly while said spaced portions are in stationary relation to the wall of said bore.

ARNOLD EDWARD LUDWIG.